(12) United States Patent
Gonzalez-Garcia et al.

(10) Patent No.: US 10,829,691 B2
(45) Date of Patent: Nov. 10, 2020

(54) INORGANIC THERMOSET RESINS AND METHODS OF MAKING THEREOF

(71) Applicant: THE BOEING COMPANY, Chicago, IL (US)

(72) Inventors: Ana Gonzalez-Garcia, Madrid (ES); Pedro Pablo Martin-Alonso, Madrid (ES); Nieves Lapena-Rey, Madrid (ES); Amelia Martinez-Alonso, Oviedo (ES); Tomas Gonzalez-Rodriguez, Oviedo (ES)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 16/262,449

(22) Filed: Jan. 30, 2019

(65) Prior Publication Data
US 2019/0161680 A1 May 30, 2019

Related U.S. Application Data

(62) Division of application No. 15/227,788, filed on Aug. 3, 2016, now Pat. No. 10,227,530.

(30) Foreign Application Priority Data

Aug. 10, 2015 (EP) .................... 15382423

(51) Int. Cl.
| | |
|---|---|
| *C09K 21/02* | (2006.01) |
| *B64C 1/06* | (2006.01) |
| *B64C 1/40* | (2006.01) |
| *C04B 35/80* | (2006.01) |
| *C04B 28/26* | (2006.01) |
| *C04B 14/10* | (2006.01) |
| *C04B 111/28* | (2006.01) |

(52) U.S. Cl.
CPC .............. *C09K 21/02* (2013.01); *B64C 1/066* (2013.01); *B64C 1/40* (2013.01); *C04B 14/10* (2013.01); *C04B 28/26* (2013.01); *C04B 35/803* (2013.01); *C04B 2111/28* (2013.01); *C04B 2235/3201* (2013.01); *C04B 2235/3217* (2013.01); *C04B 2235/3244* (2013.01); *C04B 2235/3418* (2013.01); *C04B 2235/3427* (2013.01); *C04B 2235/5284* (2013.01); *C04B 2235/6567* (2013.01); *C04B 2235/9607* (2013.01)

(58) Field of Classification Search
CPC ....... C09K 21/02; C04B 35/803; C04B 14/10; C04B 28/26; C04B 2235/3217; C04B 2235/9607; C04B 2235/6567; C04B 2235/5284; C04B 2235/3427; C04B 2235/3418; C04B 2235/3244; C04B 2235/3201; C04B 2111/28; B64C 1/066; B64C 1/40

See application file for complete search history.

(56) References Cited

U.S. PATENT DOCUMENTS

| | | | | |
|---|---|---|---|---|
| 5,342,595 | A * | 8/1994 | Davidovits | C01B 33/26 106/286.5 |
| 2013/0130886 | A1 * | 5/2013 | Davidovics | C04B 28/006 501/32 |
| 2014/0090842 | A1 * | 4/2014 | Patil | E21B 33/138 166/293 |

OTHER PUBLICATIONS

European Patent Office Examination Report for Application No. 15 382 423.0-1106 dated Jul. 29, 2019.
European Patent Office Examination Report for Application No. 15 382 423.0-1106 dated Sep. 16, 2020.

* cited by examiner

Primary Examiner — Andrew J. Oyer
(74) Attorney, Agent, or Firm — Patterson + Sheridan, LLP

(57) ABSTRACT

In a first aspect, the present disclosure provides a method for making an inorganic thermoset resin, the method comprising:
(a) mixing $SiO_2$, $H_2O$ and a metallic hydroxide for generating an alkaline aqueous solution with pH from 10 to 14 comprising a metallic silicate, wherein said metallic hydroxide generates a first metallic oxide in the aqueous solution,
(b) adding aluminum oxide ($Al_2O_3$) and silicon oxide ($SiO_2$) to the alkaline aqueous solution comprising a metallic silicate generated in step (a) and
(c) adding halloysite nanotubes ($Al_2Si_2O_5(OH)_4$) to the solution generated in step (b).

The present disclosure further provides an inorganic thermoset resin obtainable by the method as defined in the first aspect of the disclosure.

20 Claims, No Drawings

INORGANIC THERMOSET RESINS AND METHODS OF MAKING THEREOF

CROSS-REFERENCE TO RELATED APPLICATIONS

This application is a Divisional of U.S. application Ser. No. 15/227,788, filed on Aug. 3, 2016, issued as U.S. Pat. No. 10,227,530 B2 on Mar. 12, 2019, which claims the benefit of European Application Serial Number EP 15382423.0, filed Aug. 10, 2015, which are both herein incorporated by reference in its entirety.

FIELD

The present disclosure relates to methods for making fire resistant inorganic thermoset resins. Particularly, this disclosure relates to a method for making a fire resistant inorganic thermoset resin comprising adding metal oxides and halloysite nanotubes to an alkaline silicate solution.

BACKGROUND

Previous solutions to make inorganic thermoset resins included, for example, contacting potassium silicate solution, water, $Al_2O_3$, $ZrO_2$ and kaolin. $ZrO_2$ and kaolin are common fillers in geopolymeric resins. A gel is formed that finally forms the inorganic thermoset resin. Then, metakaolin in powder form is added to the thermoset resin to avoid shrinkage during the resin curing. Dissolution of metakaolin powder is not a straightforward step, since this powder has low solubility. Metakaolin needs to be dissolved for a predetermined period of time. This is a time consuming and expensive step (metakaolin needs to be finely dispersed in the alkaline solution and that involves a complex process using a special mixing apparatus). Moreover, since metakaolin has to be added in a certain % weight of the resin, the addition of metakaolin considerably increases the weight of the resin.

There is a need in the art for an improved method to make fire resistant inorganic thermoset resins which eliminates the step of addition of the anti-shrinkage filler metakaolin, while at the same time provides a fire resistant inorganic thermoset resin which does not shrink during the resin curing.

SUMMARY

In a first aspect, the present disclosure provides a method for making an inorganic thermoset resin, the method comprising:
 (a) mixing $SiO_2$, $H_2O$ and a metallic hydroxide for generating an alkaline aqueous solution with pH from 10 to 14 comprising a metallic silicate, wherein said metallic hydroxide generates a first metallic oxide in the aqueous solution,
 (b) adding aluminum oxide ($Al_2O_3$) and silicon oxide ($SiO_2$) to the alkaline aqueous solution comprising a metallic silicate generated in step (a) and
 (c) adding halloysite nanotubes ($Al_2Si_2O_5(OH)_4$) to the solution generated in step (b).

The present disclosure further provides an inorganic thermoset resin obtainable by the method as defined in the first aspect of the disclosure.

DETAILED DESCRIPTION

A first aspect of the present disclosure is a method for making an inorganic thermoset resin, the method comprising:
 (a) mixing $SiO_2$, $H_2O$ and a metallic hydroxide for generating an alkaline aqueous solution with pH from 10 to 14 comprising a metallic silicate, wherein said metallic hydroxide generates a first metallic oxide in the aqueous solution,
 (b) adding aluminum oxide ($Al_2O_3$) and silicon oxide ($SiO_2$) to the alkaline aqueous solution comprising a metallic silicate generated in step (a) and
 (c) adding halloysite nanotubes ($Al_2Si_2O_5(OH)_4$) to the solution generated in step (b).

Halloysite is defined as an aluminosilicate clay mineral mined from natural geological deposits that is chemically identical to kaolin, but differs in its morphology by possessing a unique crystal structure which can, under proper geological conditions, facilitate the formation of hollow nanotubes rather than only a stacked plate-like structure as observed in kaolin. In the present disclosure, Halloysite nanotubes are referred interchangeably as halloysite nanotubes or HNT.

Halloysite nanotubes are abundant and cheap.

The present disclosure provides a simplified method to produce inorganic thermoset resins.

The present disclosure eliminates the need for metakaolin (anti shrinkage agent). Instead of kaolin, halloysite nanotubes are used.

Halloysite nanotubes have the same chemical formula as kaolin but have a different structural morphology. However, the mechanism of the reaction that liberates free —Si—O—Al— species is the same as described below for kaolin but, in addition, halloysite nanotubes prevent the geopolymer resin from cracking during and after polymerization (curing) of the resin, eliminating the need for metakaolin. Thus, methods of the present disclosure:
 Offer a simplified manufacturing process since the metakaolin filler addition, which was essential to avoid shrinkage during the curing of the resin, and which involved an expensive and time consuming process, is no longer needed. The filler addition is done in just one step leading to oligo-sialate formation.
 Halloysite nanotubes act as a nanoscale reinforcement filler material effectively forming a nanocomposite material. This leads to improved mechanical properties.
 Reduces the weight of the resin, since metakaolin is not needed.

Halloysite nanotubes have a double functionality in the resin synthesis: (1) is part of the composition of the resin forming Si—O—Al species necessary for the proper formation of the geopolymeric resin; and (2) it also serves as filler eliminating the addition of metakaolin, which is time consuming, expensive and increases the weight of the geopolymer resin prior art.

Methods of the present disclosure eliminate the step of adding metakaolin and makes the production of the inorganic thermoset resin easier than existing solutions.

$ZrO_2$ and kaolin are common fillers in geopolymeric resins. Additional mineral fillers such as metakaolin were added to inorganic thermoset resins to avoid shrinkage after curing the resin. The addition of metakaolin to the inorganic thermoset resins was not a simple process. Metakaolin is a powder that needed to be finely dispersed in order to be incorporated into the solution. This process was done by using a particular mixing apparatus and was very time consuming.

Moreover, the addition of metakaolin contributes to increasing the weight of the resin prepared.

Therefore, the synthesis should be simplified in order to make its production feasible at industrial scale.

The present disclosure is directed to the addition of halloysite nanotubes as nanoscale additive for inorganic polymer resins as well as a filler of the inorganic polymer thermoset resins.

In a second aspect of the present disclosure, in step (a) the metallic silicate is selected from the group consisting of silicate of an alkali metal, silicate of an alkaline earth metal and silicate of a transition metal and mixtures thereof.

In the second aspect of the present disclosure, the metal is selected from the group consisting of Na, K, Li, Ca, Mg and Fe.

In a third aspect of the present disclosure, in step (a) the concentration of the metallic silicate is between about 3 M and about 4 M.

In a fourth aspect of the present disclosure, in step (b) the first metallic oxide/$SiO_2$ molar ratio is between about 0.08 and about 0.4.

In a fifth aspect of the present disclosure, in step (b) the first metallic oxide/$Al_2O_3$ molar ratio is between about 0.6 and about 15.

In a sixth aspect of the present disclosure, in step (b) the $SiO_2/Al_2O_3$ molar ratio is between about 3.5 and about 100.

In a seventh aspect of the present disclosure, a second metallic oxide is added to the solution generated in step (b), wherein the second metallic oxide is an oxide of a transition metal.

In the seventh aspect of the present disclosure, the transition metal is Zr or Ti.

In the seventh aspect of the present disclosure, the second metallic oxide is added at a concentration of between about 1% and about 10% by weight with respect to the total weight of the aqueous solution.

In an eighth aspect of the present disclosure, in step (c) halloysite nanotubes ($Al_2Si_2O_5(OH)_4$) are added at a concentration of between about 2% and about 20% by weight with respect to the total weight of the aqueous solution.

In a ninth aspect, the present disclosure further provides an inorganic thermoset resin formed by the method as defined in the first aspect of the disclosure.

The curing of the inorganic thermoset resin according to the seventh aspect of the disclosure is carried out by heating at a temperature of between about 60° C. and about 80° C. for between about 1.5 hours and about 3 hours. The curing may be also carried out at ambient temperature for several hours, for example, about 24 hours.

The inorganic thermoset resin according to the seventh aspect of the disclosure has many applications in several fields. It could be used in aerospace field for aircraft and space vehicles. It could also be used in trains and automobiles, vessels and other transportation vehicles and by composite manufacturers. In fact, the resin could be incorporated in any industrially manufactured products or goods. The inorganic thermoset resin may be used as a resin in state-of-the-art fiber-reinforced inorganic polymer resin (FRIP) composites.

The outstanding fire resistance of the inorganic thermoset resin according to, for example, the seventh aspect of the disclosure up to 1000° C., makes it a very sought after product for applications where there are stringent fire resistance requirements. For example, in aircraft interiors.

The inorganic thermoset resin according to, for example, the seventh aspect of the disclosure can be used in any type of light weight fiber reinforced composites subjected to stringent fire resistance requirements. Although its application is certainly not restricted to aircraft applications, one high value application is in natural fiber reinforced composites in sandwich panels for aircraft interiors.

The inorganic thermoset resin according to the seventh aspect of the disclosure is obtained from natural nanoscale minerals and industry by products that are safe to produce and do not require specialized safety equipment, do not produce harmful chemical residues and are naturally fire resistant. The outstanding fire resistant properties of the inorganic thermoset resin of the disclosure are the result of its main ingredients being fire resistant themselves. This eliminates the need to apply or employ fire resistant additives in order to make the system fire resistant.

EXAMPLES

Example 1. Preparation of the Inorganic Thermoset Resin

Methods of the present disclosure comprise preparing a stable alkaline aqueous solution. Solutions comprise a Potassium Silicate solution ($K_2SiO_3$) using the starting components $SiO_2$, $H_2O$ and KOH. $K_2O$ is formed in the reaction from KOH.

Moreover, NaOH or any other suitable metallic hydroxide could be used to generate the corresponding metallic silicate as the alkaline silicate based medium which is necessary to obtain the geopolymeric resin.

The starting components are used as follows:
Molar ratio $K_2O/SiO_2=1$
50% by weight is $H_2O$/50% by weight is solid (KOH and $SiO_2$).
This solution reaches about pH=13.
($SiO_2K_2O \cdot H_2O = K_2SiO_3 \cdot H_2O$)

Then, water was added until a 3.5 M silicate $K_2SiO_3$ aqueous solution was generated.

Then, Aluminum oxide ($Al_2O_3$) and silicon oxide ($SiO_2$) were added and mixed for 5 minutes. In this step, the following molar ratios were used:
$K_2O/SiO_2=0.16$
$SiO_2/Al_2O_3=16$
$K_2O/Al_2O_3=2.61$ Then, Zirconium oxide ($ZrO_2$) was added at a concentration of 4% by weight with respect to the total weight of the aqueous solution and mixed for 5 minutes.

Halloysite nanotubes ($Al_2Si_2O_5(OH)_4$) in 10% by weight with respect to the total weight of the aqueous solution were then added and mixed for 1 hour.

All of these processes were carried out at ambient temperature.

The inorganic thermoset resin was then cured at 80° C. for 2 hours.

Example 2. Boiling Water Tests

The Boiling water test (BWT) is a test procedure known by the skilled person that determines whether a thermoset inorganic resin has undergone a correct polymerization and, therefore, if it has properly cured. The appropriate polymerization of the resin is crucial for the applicability of the resin so it could also be considered as a screening test before fine tuning any process development for inorganic thermoset resins.

The test consists of introducing small pieces of the cured resin in boiled water during 20 minutes. There are two possible scenarios:

The samples of the cured resin do not suffer deformation or degradation after the boiling water tests, indicating the correct polymerization of the resin. In this case, the resin passes the Boiling water test, showing that the resin has properly cured.

The samples of cured resin suffer deformation or disintegration after (or before) the 20 min boiling water test, indicating that the resin has not polymerized. In this case the resin fails the BWT, showing that the resin has not properly cured.

To provide an accurate estimation of whether the samples suffer deformation and/or disintegration during such test, the diameter of the small pieces of cured resin samples subjected to the test are measured before and after the BWTs. This allows measuring any possible variation that the diameter of the cured samples could suffer at a millimeter scale.

Boiling Water Test Results:

Samples of the inorganic thermoset resin of the disclosure were subjected to the BWTs in order to assess if the resin had properly polymerized using. The resin successfully passed the BWTs since there was diameter resilience and no variation/disintegration of the samples was observed after immersing the samples in boiling water for 20 min. This indicates a correct polymerization/curing of the resin.

Example 3. Fire Resistance

The inorganic thermoset resin's fire resistance was tested by subjecting 3 sandwich panels comprising outer skins made of flax fibers+inorganic thermoset resin of the disclosure, and a polyetherimide (PEI) foam as a core material to OSU test (Ohio State University test), which is the most stringent test to comply with fire requirements.

The OSU test is a method used to determine the Heat Release Rate from cabin materials exposed to radiant Heat (FAR 25, Appendix F part IV).

Summary of OSU Test

The specimen to be tested is injected into an environmental chamber through which a constant flow of air passes. The specimen's exposure is determined by a radiant heat source adjusted to produce the desired total heat flux on the specimen of 3.5 Watts/cm$^2$, using a calibrated calorimeter.

The specimen is tested so that the exposed surface is vertical. Combustion is initiated by piloted ignition. The combustion products leaving the chamber are monitored in order to calculate the release rate of heat, which must be below 65 kW/m$^2$.

Table 1 shows that the panels prepared with inorganic thermoset resin of the disclosure successfully passed the OSU tests.

The resin has excellent fire resistance, which makes it suitable for many applications, including, but not limited to, aircraft interiors.

TABLE 1

OSU tests results of the panels prepared using the inorganic thermoset resin of the disclosure.

| Panel | Total heat released (kW/m$^2$) | Heat released after the first two minutes (kW*min/m$^2$) |
|---|---|---|
| Panel 1 | 35.43 (a 72 s) | 22.45 |
| Panel 2 | 30.15 (a 56 s) | 28.73 |
| Panel 3 | 36.30 (a 67 s) | 31.99 |
| Values obtained | 33.96 | 27.72 |
| Threshold value | <65 | <65 |

The invention claimed is:

1. An inorganic thermoset resin, formed by a method comprising:

mixing $SiO_2$, $H_2O$ and a metallic hydroxide to form an alkaline aqueous solution having a pH from about 10 to about 14 comprising a metallic silicate, wherein said metallic hydroxide generates a first metallic oxide in the alkaline aqueous solution;

introducing aluminum oxide ($Al_2O_3$) and silicon oxide ($SiO_2$) to the alkaline aqueous solution comprising the metallic silicate; and introducing halloysite nanotubes ($Al_2Si_2O_5(OH)_4$) to the alkaline aqueous solution to form an Si—O—Al species, wherein the Si—O—Al species form part of the inorganic thermoset resin.

2. The inorganic thermoset resin according to claim 1, wherein a concentration of said metallic silicate in the alkaline aqueous solution is from about 3 M to about 4 M.

3. The inorganic thermoset resin according to claim 1, wherein a first metallic oxide/$SiO_2$ molar ratio is from about 0.08 to about 0.4.

4. The inorganic thermoset resin according to claim 1, wherein a first metallic oxide/$Al_2O_3$ molar ratio is from about 0.6 to about 15.

5. The inorganic thermoset resin according to claim 1, wherein a $SiO_2/Al_2O_3$ molar ratio is from about 3.5 to about 100.

6. The inorganic thermoset resin according to claim 1, further comprising adding a second metallic oxide to the alkaline aqueous solution, wherein said second metallic oxide is an oxide of a transition metal.

7. The inorganic thermoset resin according to claim 6, wherein a concentration of the second metallic oxide in the alkaline aqueous solution is from about 1% to about 10% by weight with respect to the total weight of the alkaline aqueous solution.

8. The inorganic thermoset resin according to claim 1, further comprising curing the alkaline aqueous solution to form the inorganic thermoset resin comprising a product of the metallic silicate and the Si—O—Al species, wherein curing the alkaline aqueous solution comprises heating the alkaline aqueous solution at a temperature of from about 60° C. to about 80° C.

9. The inorganic thermoset resin according to claim 8, wherein heating is performed for from about 1.5 hours to about 3 hours.

10. The inorganic thermoset resin according to claim 1, further comprising curing the alkaline aqueous solution to form the inorganic thermoset resin comprising a product of the metallic silicate and the Si—O—Al species, wherein curing the alkaline aqueous solution is conducted at ambient temperature.

11. The inorganic thermoset resin according to claim 1, further comprising adding halloysite nanotubes ($Al_2Si_2O_5(OH)_4$) to the alkaline aqueous solution such that a concentration of the halloysite nanotubes in the alkaline aqueous solution is from about 2% to about 20% by weight with respect to the total weight of the alkaline aqueous solution.

12. The inorganic thermoset resin of claim 1, wherein the halloysite nanotubes are further configured to be a nanoscale reinforcement filler material configured to reduce shrinkage when the alkaline aqueous solution is cured.

13. A fiber-reinforced inorganic thermoset resin composite, comprising:
fibers; and
an inorganic thermoset resin, comprising:
a metallic silicate;
a halloysite nanotube ($Al_2Si_2O_5(OH)_4$) filler; and
a plurality of Si—O—Al species liberated from the halloysite nanotube ($Al_2Si_2O_5(OH)_4$) filler.

14. The fiber-reinforced inorganic thermoset resin composite of claim 13, wherein the fiber-reinforced inorganic thermoset resin has a fire resistance with a heat release value of less than 65 kW*min/m$^2$.

15. The fiber-reinforced inorganic thermoset resin composite of claim 13, wherein the metallic silicate is selected from the group consisting of silicate of an alkali metal, silicate of an alkaline earth metal, silicate of a transition metal, and mixtures thereof.

16. The fiber-reinforced inorganic thermoset resin composite of claim 13, wherein the metal silicate is selected from the group consisting of Na, K, Li, Ca, Mg and Fe silicates.

17. The fiber-reinforced inorganic thermoset resin composite of claim 13, further comprising an oxide of a transition metal.

18. The fiber-reinforced inorganic thermoset resin composite of claim 17, wherein the transition metal is Zr or Ti.

19. The fiber-reinforced inorganic thermoset resin composite of claim 13, wherein the inorganic thermoset resin consists essentially of:
the metallic silicate;
the halloysite nanotubes($Al_2Si_2O_5(OH)_4$) filler; and
the plurality of Si—O—Al species.

20. The fiber-reinforced inorganic thermoset resin composite of claim 19, wherein the inorganic thermoset resin is devoid of kaolin.

* * * * *